United States Patent [19]

Neeman et al.

[11] Patent Number: 5,519,855

[45] Date of Patent: May 21, 1996

[54] SUMMARY CATALOGS

[75] Inventors: Yuval Neeman, Bellevue; Peter J. Cook, Issaquah; Arnold S. Miller; Noa Zalic, both of Bellevue; Balan S. Raman, Redmond; David S. Montague, Bellevue; Dave Straube, Redmond, all of Wash.

[73] Assignee: Microsoft Corporation, Redmond, Wash.

[21] Appl. No.: 181,899

[22] Filed: Jan. 14, 1994

[51] Int. Cl.⁶ ........................................... G06F 17/00
[52] U.S. Cl. ...................... 395/600; 395/427; 364/DIG. 1
[58] Field of Search ....................... 395/600, 575, 395/700, 425, 250, 325, 100; 364/191

[56] References Cited

U.S. PATENT DOCUMENTS

| | | | |
|---|---|---|---|
| 4,796,179 | 1/1989 | Lehman et al. | 364/191 |
| 5,058,162 | 10/1991 | Santon et al. | 380/25 |
| 5,077,694 | 12/1991 | Sansone et al. | 395/600 |
| 5,133,068 | 7/1992 | Crus et al. | 395/600 |
| 5,151,988 | 9/1992 | Yamagishi | 395/600 |
| 5,201,047 | 4/1993 | Maki et al. | 395/600 |
| 5,235,701 | 8/1993 | Ohler et al. | 395/600 |
| 5,237,681 | 8/1993 | Kagan et al. | 395/600 |
| 5,261,065 | 11/1993 | Urabe et al. | 395/600 |
| 5,261,080 | 11/1993 | Khoyi et al. | 395/500 |
| 5,265,244 | 11/1993 | Ghosh et al. | 395/600 |
| 5,272,628 | 12/1993 | Koss | 395/600 |
| 5,276,867 | 1/1994 | Kenley et al. | 395/600 |
| 5,303,379 | 4/1994 | Khoyi et al. | 395/700 |
| 5,317,728 | 5/1994 | Tevis et al. | 395/600 |
| 5,327,529 | 7/1994 | Fults et al. | 395/155 |
| 5,392,390 | 2/1995 | Crozier | 395/161 |

FOREIGN PATENT DOCUMENTS

| | | | |
|---|---|---|---|
| 0213276 | 3/1987 | European Pat. Off. | G06F 15/40 |
| 2257273 | 1/1993 | United Kingdom | G06F 12/02 |
| WO89/02631 | 3/1989 | WIPO | G06F 15/16 |

OTHER PUBLICATIONS

Jayne Wilson, "Banyan Patches directory problem in Vines 5.5", *Infoworld* 15(37): p. 6, Sep. 13, 1993.

Jamie Lewis, "NDS and Street Talk offer distinct advantages," *PC Week* 10(13): p. 52, Apr. 5, 1993

George F. Coulouris and Jean Dollimore, *Distributed Systems–Concepts and Design*. Addison–Wesley Publishers Ltd., 1988, pp. 210–213.

C. J. Date, *An Introduction to Database Systems*, Addison–Wesley Publishing Company, Jan. 1987, pp. 487–491.

Hal Stern, *Managing NFS and NIS*, O'Reilly & Associates, Inc., 1991, Chapter 2, "Network Information Service Operation,"pp. 17–49; Chapter 3, System Management Using NIS, pp. 51–74; Chapter 4, Building Applications with NIS, pp. 75–87.

*Primary Examiner*—Thomas G. Black
*Assistant Examiner*—Cuan Pham
*Attorney, Agent, or Firm*—Seed & Berry

[57] ABSTRACT

A system provides support for the use of summary catalog data structures. In particular, the system defines such summary catalogs as data structures and provides standardized methods for operating on the data structures. The summary catalogs provide a convenient and highly available mechanism for obtaining information regarding files in the system. The summary catalogs are closely tied to queries in that the summary catalogs store query results. The summary catalogs may be encapsulated into objects that hold selected properties that are derived from other objects in a query or may be formed by other mechanisms. Copies of a summary catalog may be kept consistent using replication that propagates changes. In addition, consistency of summary catalogs with the source objects from which they originated may be maintained.

18 Claims, 6 Drawing Sheets

| ROW ID | PATH | GATHERER ID | SQN | SCOPE | PROPERTY 1 | PROPERTY 2 | STATUS | LINK |
|--------|------|-------------|-----|-------|------------|------------|--------|------|
|        |      |             |     |       |            |            |        |      |
|        |      |             |     |       |            |            |        |      |
|        |      |             |     |       |            |            |        |      |

Fig. 3

| GATHERER ID | GATHERER PATH | EPOCH # | STATUS | EXPIRE TIME | SQN HWM | DELETE HWM | FLUSHED DELETE HWM |
|---|---|---|---|---|---|---|---|
| | | | | | | | |
| | | | | | | | |

Fig. 8

SUMMARY CATALOGS

TECHNICAL FIELD

The present invention relates generally to data processing systems, and more particularly, to the use of summary catalogs within a data processing system.

BACKGROUND OF THE INVENTION

In most conventional distributed systems, it is difficult to discover information about files that are located at remote locations. Many conventional systems provide vehicles for discovering such information, but the vehicles are especially cumbersome. In particular, the vehicles are time-consuming and require a large amount of traffic to be sent across the distributed system. Moreover, there is no well-known place for storing such information in many of these systems. In systems that provide such a well-known location, the load of requests to access this information is often quite large and creates complications among the processes vying to gain access to the information.

Certain conventional database systems provide mechanisms for indexing the contents contained within databases. For instance, some conventional database systems provide inverted lists that act as indexes into the databases. Other database systems provide views (i.e., virtual tables) that hold selected information from the databases. However, none of these conventional database systems have applied such a technology in a comprehensive fashion to system level objects.

SUMMARY OF THE INVENTION

In accordance with a first aspect of a preferred embodiment of the present invention, a method is practiced in a data processing system having at least one storage device for storing files. In this method, a group of files are accessed to obtain selected information from the files. The selected information is stored in a first data structure of a given type in the storage device. The first data structure is then queried to obtain portions of the selected information stored therein. These portions of the selected information are stored in the second data structure of the given type in the storage device.

BRIEF DESCRIPTION OF THE DRAWINGS

FIG. 3 is a more detailed block diagram of the row table of the summary catalog of FIG. 2.

FIG. 8 is a diagram illustrating the format of an exemplary gatherer table in the preferred embodiment of the present invention.

DETAILED DESCRIPTION OF THE INVENTION

Figure 1:
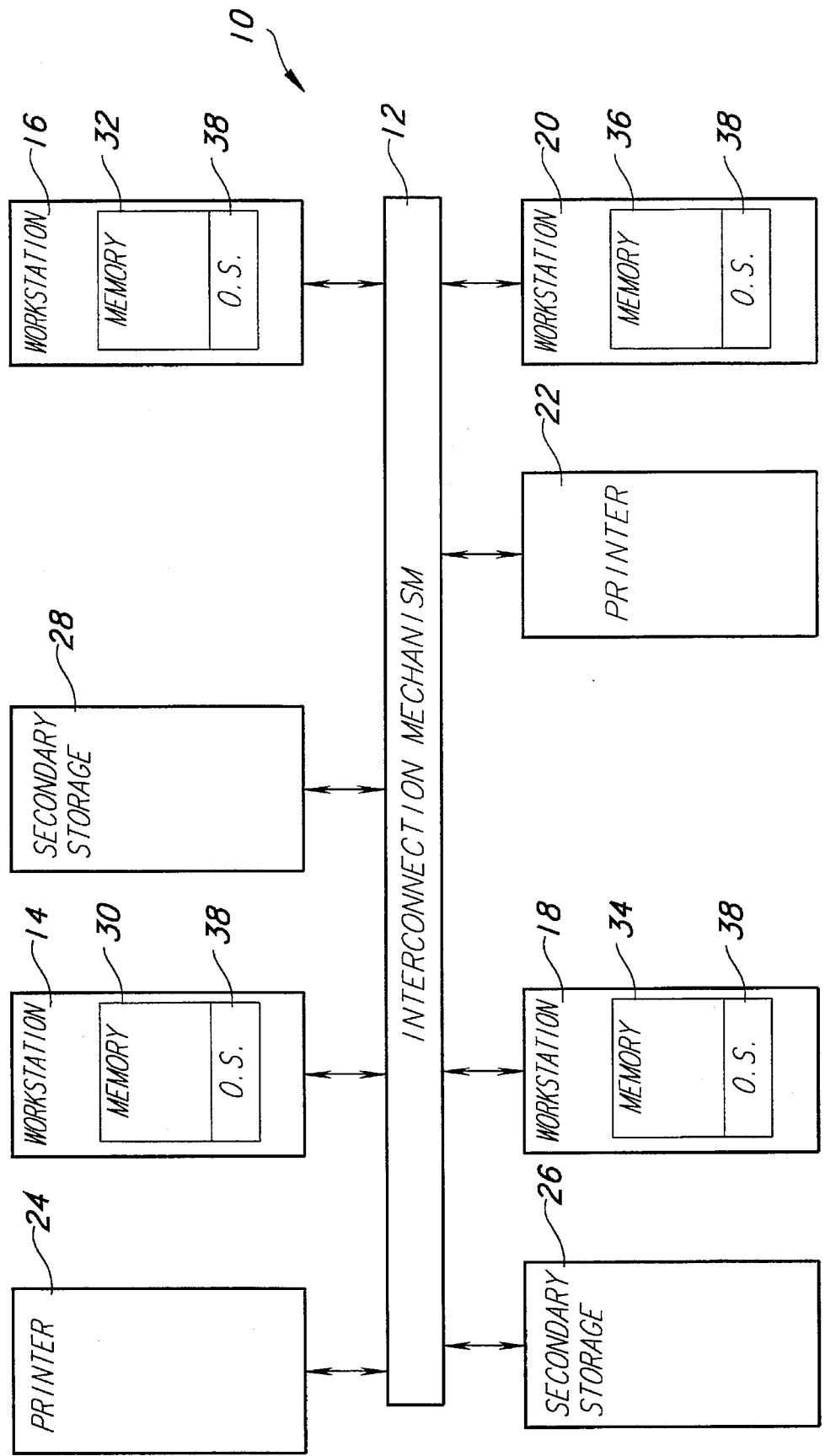
FIG. 1 is a block diagram of a distributed system that is suitable for practicing a preferred embodiment of the present invention.

The preferred embodiment of the present invention provides support for the use of summary catalog data structures. In particular, the preferred embodiment of the present invention provides a definition for such structures and a set of functions for acting upon the structures. Each summary catalog holds a selected list of properties obtained from objects (defined below). The summary catalogs provide an easy to use and efficient mechanism for quickly locating objects and properties of objects in the predefined set of objects. Summary catalogs may hold the results of queries. However, summary catalogs may be created by mechanisms other than queries.

It should be appreciated that summary catalogs are not merely specialized databases. Summary catalogs act in a distributed fashion and provide a means for directly accessing objects from within the summary catalogs. Moreover, the summary catalogs track real world changes and may have built in mechanisms for maintaining consistency with source objects.

In the preferred embodiment of the present invention, a summary catalog is an object. As an object, a summary catalog may be queried to produce query results, which in turn may be stored in another summary catalog. Thus, summary catalogs have a "recursive" nature. A summary catalog may also have other operations performed on it (such as operations that may be performed on objects in general). A summary catalog may be replicated to produce multiple copies that are distributed throughout a distributed system. Moreover, a "gatherer" may be provided by a summary catalog to maintain consistency between the summary catalog and source objects from which the summary catalog originated.

The preferred embodiment of the present invention is implemented in an object-oriented environment. Nevertheless, those skilled in the art will appreciate that the present invention is not limited to implementations within an object-oriented environment; rather, the present invention may also be practiced in other suitable non-object-oriented environments.

Before discussing the particulars of the summary catalog object, it is helpful to first introduce several concepts that are related to the preferred embodiment of the present invention. One such concept is the concept of an "object." An object is a logical structure that holds data and may also hold pointers to functions (see the discussion of "interfaces" below that act upon the data. In the preferred embodiment of the present invention, the objects hold "properties" as specific structural instances of data (objects may hold other data as well). In its inactive or closed state, an object is persistently stored as a file.

Another concept that is germane to the preferred embodiment of the present invention is the notion of an "interface." An interface is a named group of logically related functions. The interface specifies signatures (such as parameters) for the group of related functions. The interface does not provide a code for implementing the functions; rather, the code for implementing the functions is provided by objects. Objects that provide the code for an instance of an interface are said to "support" the interface. The code provided by an object that supports an interface must comply with the signatures and implied semantics specified within the interface.

The concept of a "moniker" is also relevant to the present invention. Formally, a moniker is an object that supports the standardized IMoniker interface, such as provided by the object linking and embedding (OLE) 2.0 protocol developed by Microsoft Corporation of Redmond, Wash. Informally, a moniker is a augmented pointer that is a vehicle for "binding" to an object so that the object is brought into a running state. The binding allows the loading of the object to which the moniker refers and provides a real memory pointer to the object. In other words, the moniker provides the ability to start functions that are supported by the object to which the moniker points. The IMoniker interface supported by the moniker provides functions for binding to the object which the moniker points.

FIG. 1 is a diagram of an example distributed system 10 that is suitable for practicing the preferred embodiment of the present invention. Distributed system 10 includes an interconnection mechanism 12 for interconnecting a number of different components. These components include workstations 14, 16, 18 and 20, printers 22 and 24 and secondary storage devices 26 and 28. Those skilled in the art will appreciate that the distributed system 10 shown in FIG. 1 is merely intended to be illustrative. The present invention may be practiced in other environments that have different components.

Each of the workstations 14, 16, 18 and 20 includes a respective memory 30, 32, 34 and 36. Each of the memories 30, 32, 34 and 36 includes a copy of a distributed operating system 38. The distributed operating system 38 provides the resources for defining the summary catalogs and for performing operations on the summary catalogs. The memories 30, 32, 34 and 36 also hold other objects. Additional objects may likewise be stored in the secondary storage devices 26 and 28.

A summary catalog holds selected property values that are copied from a set of source objects. Summary catalogs provide a vehicle for enhancing the speed of querying for information in the name space of the distributed system 10. Summary catalogs are highly available throughout the distributed system 10 and provide a central place for resource discovery within the distributed system. The discussion below will focus initially on the structure of summary catalogs, and then will focus on how the summary catalogs are created, accessed, updated and replicated.

Each summary catalog in the distributed system 10 is a persistently stored object. The operating system 38 defines a class of objects that is unique for summary catalogs. The class definition for the summary catalog class specifies the components of the summary catalog objects. Objects of the summary catalog class support an interface that includes functions for manipulating the summary catalog objects. The interface includes functions for gathering information to create and update summary catalogs (i.e., "gatherers"). A summary catalog object may support multiple gatherers. The gatherers may be used to periodically reconstruct the summary catalog so that changes in the source objects are reflected in the summary catalogs.

As mentioned above, summary catalogs may be replicated to enhance availability of summary catalogs across the distributed system 10. For purposes of clarity, the discussion below attempts to separate gathering and replicating even though gathering may be viewed as a type of replication. This attempt to separate replication from gathering is complicated by the inter-relationship of the two processes. The respective copies of a summary catalog may be reconciled using a replication mechanism like that described in co-pending application entitled "Replication Facility," which is assigned to a common assignee with the present application and is explicitly incorporated by reference herein. Through the use of the replication mechanism, a change in one copy of the summary catalog may be reflected in other copies of the summary catalog. As a result, consistency among the copies of the summary catalog is maintained. Consistency between a summary catalog and the source objects from which it originated may be maintained through the use of a gatherer. Gathering and replication are described in more detail below.

Figure 2:
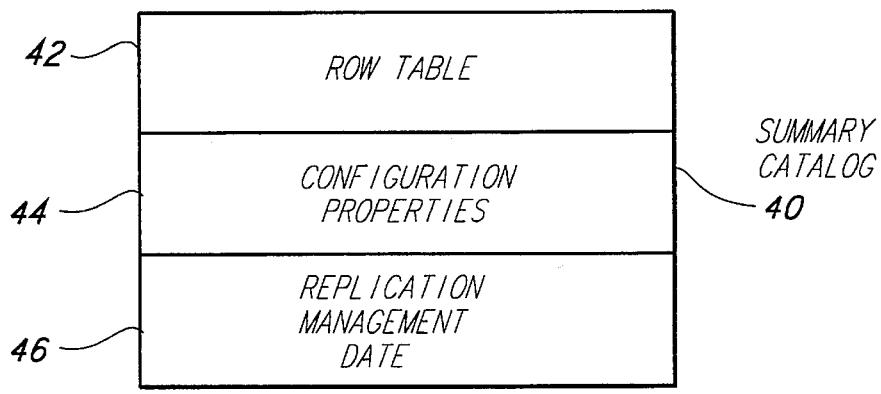
FIG. 2 is a functional block diagram of a summary catalog as generated in accordance with the preferred embodiment of the present invention.

FIG. 2 is a functional block diagram illustrating the primary components of a summary catalog 40. The summary catalog 40 includes a row table component 42 that holds the values of the properties that have been copied from the source set of objects. The summary catalog 40 also includes a configuration properties component 44. The configuration properties component 44 holds properties, a defining query for the summary catalog 40 and a maintenance schedule. The third main component of the summary catalog is a replication management data component 46. The replication management data component 46 holds data that is useful in the replication process for summary catalogs. The replication management data is used by interfaces supported by summary catalog objects.

Figure 3:
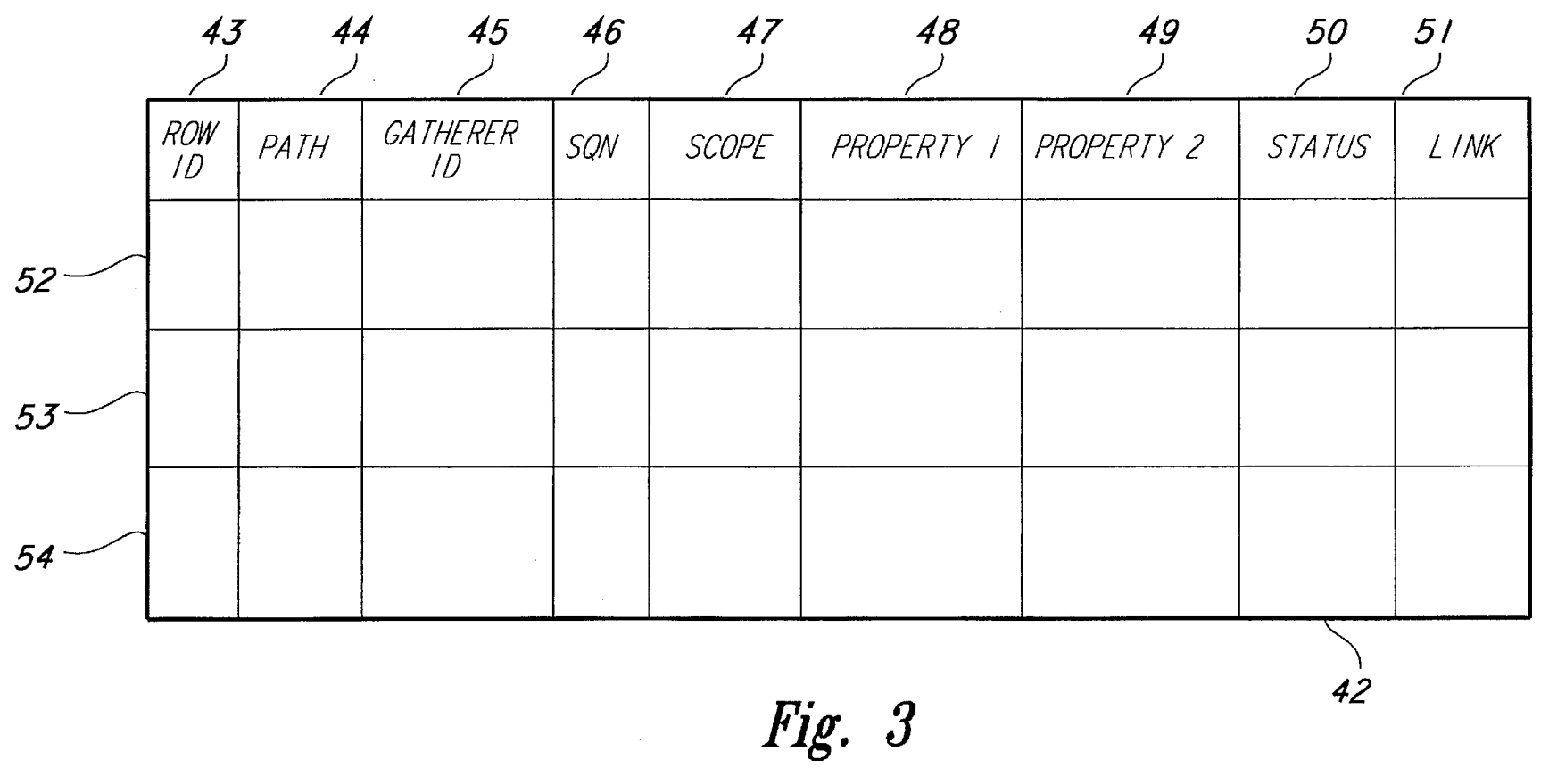

FIG. 3 is a more detailed block diagram illustrating the row table component 42 of the summary catalog 40. The row table component is organized as a table having rows 52, 53 and 54 and columns 43, 44, 45, 46, 47, 48, 49, 50 51. A row 52, 53 and 54 is provided for each object in the set of source objects from which the data of the row table originated. Each row includes columns 43, 44, 45, 46, 47, 48, 49, 50 and 51. Column 43 holds a row ID that uniquely identifies the row. Column 44 holds a logical path name for the object associated with the row. The logical path name is visible in the distributed name space of the system 10. Column 45 holds a gatherer ID. The gatherer ID uniquely identifies the gatherer that originated the row. As discussed above, a single summary catalog may have multiple gatherers. Gatherers will be discussed in more detail below. Column 46 holds a sequence number (SQN) for the row. Sequence numbers are assigned in a monotonically increasing fashion to each row in the row table 42. The role of sequence numbers will also be described in more detail below.

Column 47 identifies the scope from which properties were gathered to create the row. Each scope defines a subtree of objects in the distributed name space that are candidates for gathering into the summary catalog. The identity of the scopes to gather are configuration properties 44 of the summary catalog 40. Columns 48 and 49 hold property values that are extracted from the source objects. In the example shown in FIG. 3, column 48 is associated with property 1 and column 49 is associated with property 2. Those skilled in the art will appreciate that summary catalogs need not include only two such columns; rather they may include only a single such column or may alternatively include more than two such columns. The properties for which columns may be provided (such as columns 48 and 49) are specified by the column set (described in more detail below).

Column 50 holds a status field that indicates status. In the preferred embodiment, the status field serves as a bitmap for implementing certain functionality. For instance, one bit in the field indicates whether the row is deleted or not. Column 51 holds a link to the source object associated with the row. The link provides a means for directly accessing the object via the summary catalog.

Figure 4:
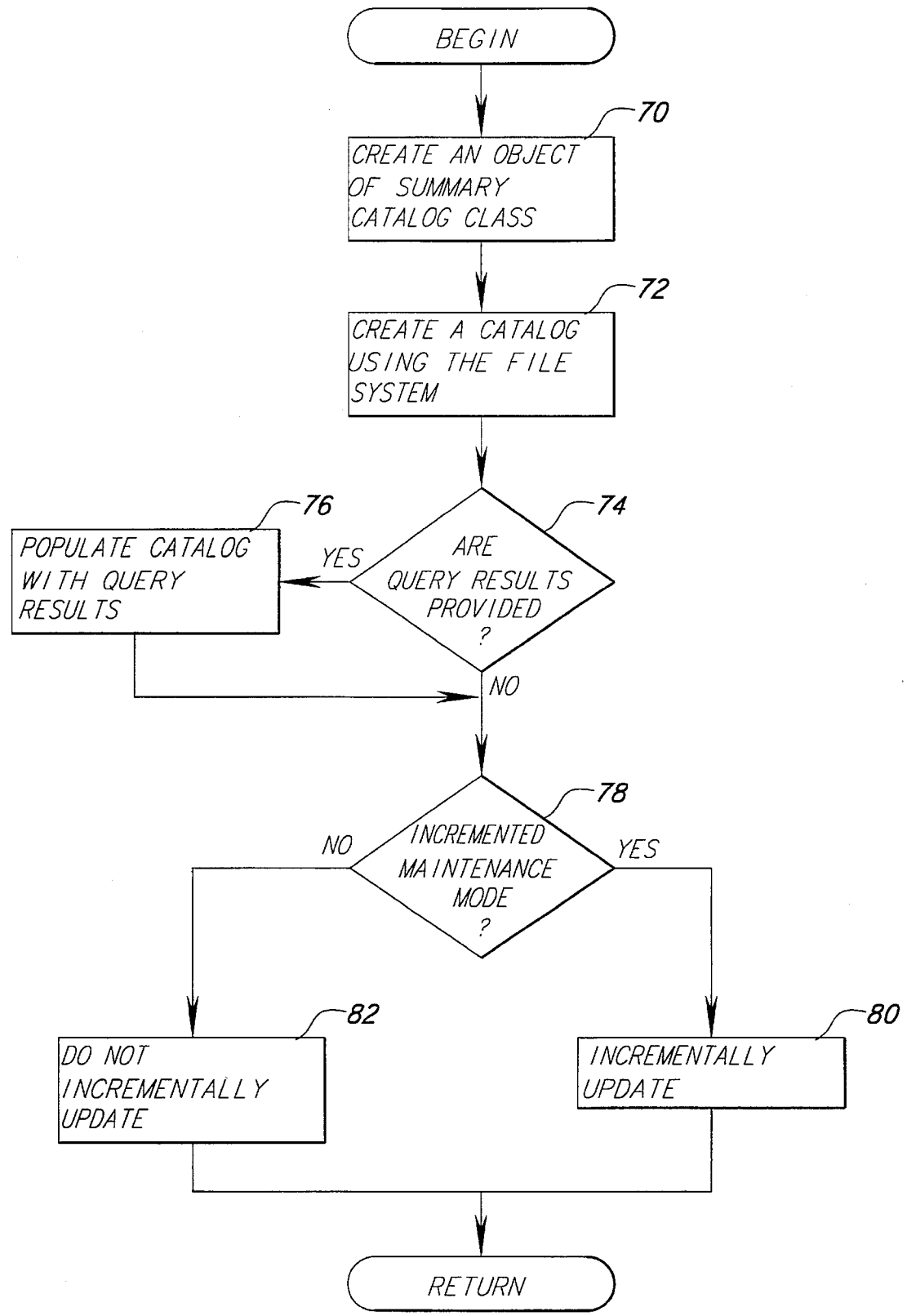
FIG. 4 is a flowchart illustrating the steps performed to create a summary catalog structure in the preferred embodiment of the present invention.

Creating a summary catalog involves simply creating an instance of the summary catalog class of objects. FIG. 4 is a flow chart illustrating the steps performed in creating a summary catalog. Initially, an object of the summary catalog class is created (step 70). In creating an object of the summary catalog class in step 70, a number of configuration parameters (i.e., properties) may be specified. The configuration parameters are stored as meta-data in the configuration properties component 44 (FIG. 2). The configuration parameters include, for example, the name of the summary catalog, a scope, a query restriction and a column set.

The scope was described briefly above. The scope specifies a path name in the distributed name space. The distributed name space is a tree structure; thus, the path name identifies the root node of the subtree to which the query is to be applied. Multiple scopes may be logically defined by a logical OR operation.

The query restriction specifies restrictions to the objects in the scope. The objects in the scope that match the restriction are gathered into the summary catalog. For example, the query restriction might limit the query to objects holding personal data by people with the last name of "Jones".

The column set specifies the set of properties on the real objects that are to be gathered into the summary catalog. For the example summary catalog shown in FIG. 3, column set includes property 1 and property 2.

A number of other configuration parameters may also be provided in creating the summary catalog object in step 70 of FIG. 4. The configuration parameters are also stored as meta-data in the configuration properties component 44 (FIG. 2). The configuration parameters may also include information that identifies query results (i.e., properties) that are to be incorporated into the row table of the summary catalog. The configuration parameters may further include a maintenance mode and a maintenance schedule. The maintenance mode specifies whether the summary catalog is to be incrementally updated or not relative to the source objects from which it originated. The maintenance schedule specifies how often the summary catalog is to be updated. The maintenance schedule may specify that the summary catalog is never to be updated, is to be updated after a certain number of time units (i.e., incrementally), or is to be updated at a specific time. Other configuration information may also be provided.

A catalog file structure is created by the file system of the operating system 38 to hold the summary catalog (step 72 in FIG. 4). Catalog structures are described in more detail in co-pending application entitled "Efficient Storage of Objects in a File System," which is assigned to the same assignee as the present application.

The configuration parameters are checked to see whether query results are provided or not (step 74). If the query results are provided, the catalog is populated with the query results (step 76). If the query results are not provided, the catalog is not immediately populated with the query results. The gathering code of the summary catalog is responsible for gathering the data that is incorporated into the summary catalog 40. The system 10 next checks whether the incremental maintenance mode has been specified for the summary catalog (step 78). Incremental maintenance mode means that the summary catalog being created is to be incrementally updated to maintain consistency with the source objects. Hence, in such instances, the summary catalog is created (step 80) and is incrementally updated by gathering. Specifically, the scope and restriction are applied again to yield values for the columns (i.e., properties) specified by the column set. The maintenance schedule specifies when gathering is to take place. Gathering only picks up changes that have occurred. It does not pick up information that has not changed. The gathering accounts for changes in their scope. More generally, gathering readily adjusts to configuration changes (as will be described in more detail below). Otherwise, the summary catalog is not automatically incrementally updated by gathering (step 82).

Figure 5:
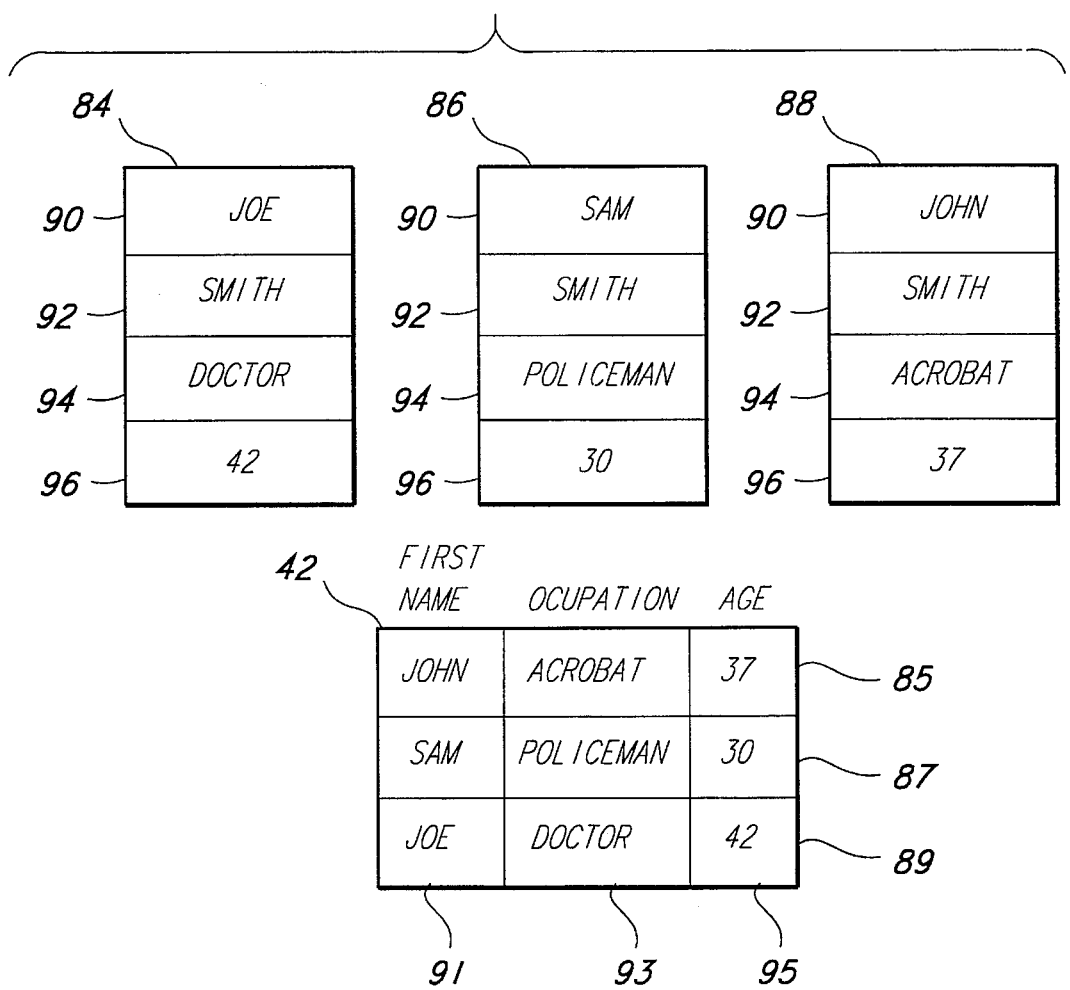
FIG. 5 is an example of how the data portion of a summary catalog is created from querying of objects in the preferred embodiment of the present invention.

The creation of a summary catalog can be better understood by considering an example. Those skilled in the art will appreciate that a summary catalog may be created in a number of different ways (e.g., explicit request, replication, etc.) that create an instance of an object of the summary catalog class. The example of FIG. 5 is merely illustrative of one approach to creating summary catalogs. FIG. 5 shows three objects 84, 86 and 88 and the data component 42 that is formed to hold the data resulting from a query on these objects. The objects 84, 86 and 88 hold data regarding individuals. Each of the objects 84, 86 and 88 includes fields 90, 92, 94 and 96 (note references for the fields relative to object 90). Field 90 holds the first name of the person, whereas field 92 holds the last name of the person. Field 94 holds the occupation of the person and field 96 holds the age of the person. All of the objects 84, 86 and 88 have a last name field 92 equal to "Smith".

The defining query specifies a set of objects to which the query applies in its scope(s). The scope(s) specify that the set of objects includes objects 84, 86 and 88 and may include additional objects. The query restriction specifies that the query is interested in objects having a last name field equal to "Smith". The column set for the query specifies that the query is interested in the following properties: first name, occupation and age. This query is then applied to objects 84, 86 and 88, and the query results are stored in the row table 42 of a summary catalog 40 (note that only a portion of the row table is shown in FIG. 5). Column 91 holds values of the first name property, column 93 holds values of the occupation property, and column 95 holds values of the age property. Entry 85 is associated with object 88, entry 87 is associated with object 86, and entry 89 is associated with object 84. The values of the properties for columns 91, 93 and 95 that are held in the objects 84, 86 and 88 are stored in the appropriate entries and columns to produce the portion of the row table 42 shown in FIG. 5.

A summary catalog 40 is accessed by calling the functions in the system-defined interface that are supported by the summary catalog objects. Summary catalogs may be used by operating system 38 as well as users of the distributed system 10. Given the nature of the summary catalogs, queries may be made that span a large portion of the distributed name space but which are still answered quickly with low traffic across the distributed system 10.

Figure 6:
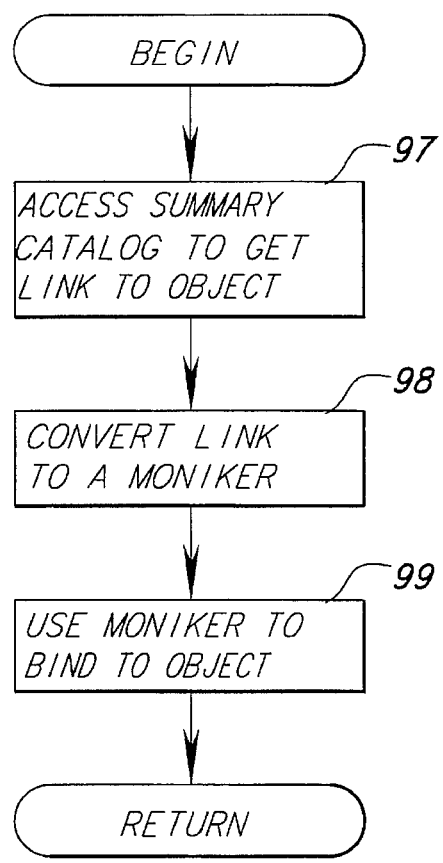
FIG. 6 is a flowchart of the steps performed to access an object directly through a summary catalog in the preferred embodiment of the present invention.

Direct access to an object may be gained by accessing a summary catalog 40. FIG. 6 is a flowchart of the steps performed to directly access an object through the summary catalog. A summary catalog is accessed to get a link to the object for which access is desired (step 97 in FIG. 6). The link is an address or path name to the object within the distributed name space. The operating system 38 (FIG. 1) includes a standardized function for converting such an address or path name to an object into a moniker. As such, in step 98, the link is converted into a moniker, and the moniker is then used to bind to the object (step 99).

As mentioned above, a summary catalog may be replicated across nodes of the distributed system 10. The replication facility used in the preferred embodiment of the present invention provides not only for the duplication of summary catalogs but also provides for reconciliation of multiple copies of summary catalogs (i.e., multimaster replication). Reconciliation refers to reconciling an object with a changed object so that the object reflects the changes made to the changed object. For example, suppose that a remote copy of an object has been changed and a local copy of object has not yet been updated to reflect the change. Reconciliation involves reconciling the two copies of the object such that the local copy of the object is changed in a like fashion to how the remote copy of the object was changed. The term "replication" as used herein, refers not only to duplicating objects so that the multiple copies of the objects are distributed across the distributed system 10 but also refers to reconciliation of the copies of the objects.

Two summary catalogs constructed from disjoint sets of objects (i.e., two disjoint scopes) may be mutually replicated. The result is the merging of the two summary catalogs. Such a merge results in the merging of rows, queries, content indices but does not result in merging of scope or schedule. This merging capability allows a distributed system to efficiently create a global summary catalog with a minimum amount of network traffic.

The merger of two summary catalogs into a single summary catalog provides a good example of how a summary catalog may have multiple gatherers. Suppose that a first summary catalog has a scope that covers all the documents on a server A. Suppose that a second summary catalog has a scope that covers all the documents on a server B. Each of the summary catalogs initially has a single gatherer associated with it. When the two summary catalogs are reconciled, resulting in merger of the summary catalogs, the resulting merged summary catalog has a first gatherer for the documents on server A and a second gatherer for the documents on server B.

In the distributed system shown in FIG. 1, a separate copy of a summary catalog may be replicated to be present on workstations 14, 16, 18 and 20. This replication enhances the availability of the summary catalogs and helps to balance a load of any one copy of the summary catalog. The summary catalogs may be replicated using a mechanism like that described in the above-referenced co-pending application entitled "Replication Facility."

Before addressing the details of summary catalog replication, it is helpful to introduce some relevant terms. An "object set" is a collection of objects that are grouped together for replication. An object set may include a single object or an entire subtree from the distributed name space. The object set is specified by the party requesting replication. A "replica set" is a collection of systems within the distributed system which each own a local copy of an object set. A "replica" is a member of a replica set.

Figure 7:
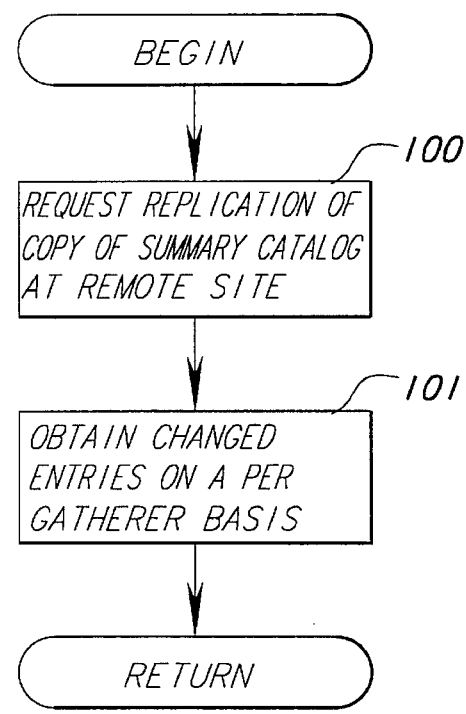
FIG. 7 is a flowchart illustrating how a summary catalog is replicated using a replication mechanism in the preferred embodiment of the present invention.

A flowchart of the steps performed during summary catalog replication is shown in FIG. 7. Initially, a request for replication of a copy of a summary catalog at a remote site is received at a local summary catalog (see step 100). In response to the request, a list of change entries is obtained from the remote summary catalog by a class-specific reconciler (i.e., a reconciler that is specific to the summary catalogs class) (step 101). The list of change entries is obtained on a per-gatherer basis. As was mentioned above, each row of the row table 42 of the summary catalog 40 holds a gatherer ID in column 45 (FIG. 3) that identifies the associated gatherer for the row. A sequence number (SQN) value is held for each row in column 46. The sequence number value indicates when the associated entry was last changed. Thus, each row in the remote summary catalog with a specified gatherer ID is examined and it is determined whether the sequence number held in column 46 for the entry is larger than a sequence value specifying when the last time changes were sent to the local summary catalog for the specified gatherer. This is performed for each gatherer having an associated row in the remote summary catalog. The local summary catalog is then reconciled with the remote summary catalog by the class-specific reconciler.

Rows within summary catalogs that lack gatherers are removed in the preferred embodiment of the present invention. A row may lose its gatherer in several ways. First, the scope of the gatherer may be redefined such that it no longer gathers information for a row (i.e., the scope is redefined so as to no longer gather information from the source object associated with the row). Second, the replication topology for replica sets may change such that there is no longer a replication path between two replicas. Third, no changes have been generated by the gatherer in a long period of time and, as a result, the gatherer is believed to no longer be active. In this latter case, the preferred embodiment of the present invention provides a mechanism for each summary catalog to announce its existence regularly in order to ensure that its rows are not deemed stale by other summary catalogs. This mechanism will be described in more detail below.

It should also be appreciated that the approach of the preferred embodiment of the present invention prevents information about objects on machines that cannot be reached during a gathering cycle from being purged. For instance, information that is kept on a disconnected machine that is not directly accessible to the distributed system during a gathering cycle is not purged. A gatherer still exists for such information and, hence, the rows associated with the gatherer are not deleted.

Each summary catalog maintains state about each gatherer having an ID in the summary catalog row table 42 to resolve some of the problems highlighted above. It should be appreciated that each replica can have multiple entries in the gatherer table 104. For instance, an entry may be provided in the gatherer table 104 for a gatherer for a replica that gathers information from directory service objects and a separate entry may be provided for another gatherer for the same replica that gathers information from non-directory service objects.

Figure 8:
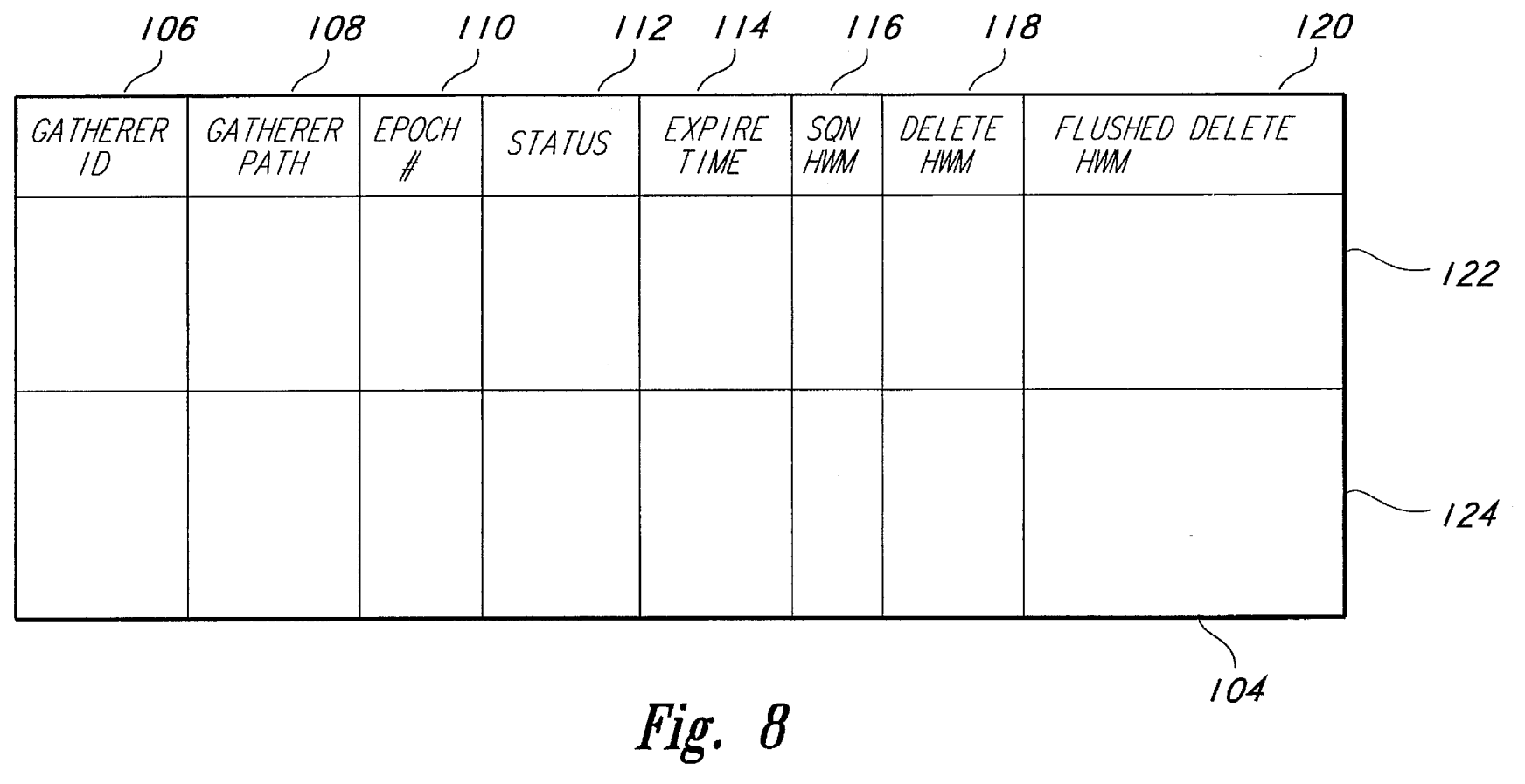

FIG. 8 depicts the format of a gatherer table 104. The gatherer table 104 includes entries 122 and 124 for each gatherer having an own row within the row table 42 (FIG. 3). Each of the entries 122 and 124 constitutes a row of the gatherer table 104. The gatherer table 104 also includes a number of columns 106, 108, 110, 112, 114, 116, 118 and 120. Each of the columns holds a value of a respective field of entries 122 and 124.

Column 106 holds an ID for the gatherer. Column 108 holds a logical path name which is a machine relative path name for the summary catalog for which the gatherer is instantiated. Column 110 holds an epoch number for the summary catalog object that instantiates the gatherer. The epoch number is a sequence number that indicates that the summary catalog is still alive. Each summary catalog increments its field on a periodic basis to keep the summary catalog viable.

Column 112 holds a status field. The status field is used in maintenance of the summary catalogs. The status field may assume one of four possible values. An "OK" value indicates that the summary catalog that instantiates the gatherer associated with the row is alive. An "EXPIRED" value indicates that the epoch number in column 110 for the entry has not been advanced and thus has expired. A "FLUSHED" value indicates that the rows associated with the gatherer have been flushed from row table 42 of the summary catalog 40. Lastly, a "FLUSH PENDING" value indicates that a flush is either in progress or will be attempted.

Column 114 holds an expire time value. When the status column 112 holds an "OK" value, the expired time holds the time at which the summary catalog is considered to be implicitly removed unless a newer epoch number is reported. However, if the status field held in column 112 has a value of "EXPIRED," the expire time held in column 114 specifies when the transition will be made to the "FLUSH PENDING" status. When the status field in column 112 holds a value of "FLUSHED," the expire time held in column 114 specifies the time at which the entry will be removed from the gatherer table 104.

Column 116 holds a sequence number high water mark (HWM). The sequence number high water mark specifies the highest sequence number received from the gatherer. The sequence number high water mark is used to determine if a reconciliation partner has new change entries which need to be queried. This value is used in the replication process described above relative to FIG. 7.

Column 118 holds a delete high water mark, which is the highest sequence number received for a delete entry from the gatherer. Lastly, column 120 holds a flushed delete high water mark. The flushed delete high water mark records the sequence number of the last delete entry for the gatherer which has been removed.

The distinction between flushed entries and marked as deleted entries is that flush entries have been removed from the summary catalog table, whereas the marked as deleted entries have not been removed but rather have merely been marked as deleted. The flushed entries and marked as deleted entries are used as follows. A gatherer for a row may detect that a real source object no longer exists for the row and, therefore, the corresponding row should be deleted. Since this deletion constitutes a change that must be propagated to other replicas, the row cannot be deleted; rather the row is merely marked as deleted. User queries against the summary catalog are augmented to filter out the rows that are marked as deleted. After some period of time, the marked as deleted rows are actually deleted or "FLUSHED." The high water marks discussed above, enable a replica to identify the case where a source replica has already flushed some marked as deleted rows which the destination replica has not yet received.

Reconciliation occurs not only for row table data but also for meta data (i.e., the other data maintained by the summary catalog 40). Certain types of meta data, such as scope configuration, query restriction and gatherer schedule, are not reconciled. Reconciliation of meta data also occurs on a per gatherer basis.

The approach of the preferred embodiment of the present invention is efficient in that it only sends the minimal amount of information necessary to update the summary catalogs. Moreover, the preferred embodiment provides a user with the option of balancing the frequency of need for updating objects with the computational resources required for such updating.

While the present invention has been described with reference to a preferred embodiment thereof, those skilled in the art will appreciate that various changes in form and detail may be made without departing from the scope of the present invention as defined in the appended claims. For instance, the present invention may be implemented in a non-distributed environment.

We claim:

1. In a data processing system having at least one storage device for storing files and a processor running an operating system, a method comprising the computer-implemented steps of:

provided with the operating system a selected class of objects for storing information derived from queries of files;

accessing a group of files to obtain selected information from the files;

storing the selected information in a first object of the selected class of objects in the storage device;

querying the first object to obtain portions of the selected information stored in the first object; and storing the portions of the selected information in a second object of the selected class of objects in the storage device.

2. The method of claim 1 wherein the step of accessing the group of files comprises the step of querying the group of files to obtain selected information from the files.

3. The method of claim 1 wherein the step of storing the selected information in the first object of the selected class of objects in the storage device further comprises the step of storing a separate entry in the first object for each file in the group of files wherein each entry holds selected information obtained from the file.

4. The method of claim 1 wherein the step of storing the portions of the selected information in the first object of the selected class of objects in the storage device further comprises the step of storing a separate entry in the second object for an entry in the first object.

5. The method of claim 1, further comprising the step of storing access information for each file in the group of files in the first object, said access information enabling access to the file.

6. The method of claim 5, further comprising the step of converting the access information stored for at least one file in the first object into a moniker.

7. The method of claim 5 wherein the access information is a moniker.

8. The method of claim 1, further comprising the step of storing access information for each file in the group of files in the second object, said access information enabling access to the file.

9. The method of claim 8, further comprising the step of converting the access information stored for at least one file in the second object into a moniker.

10. The method of claim 8 wherein the access information is a moniker.

11. The method of claim 1 wherein storage provided by the storage device is logically partitioned into volumes and wherein the accessed group of files span multiple volumes.

12. The method of claim 11 wherein storage provided by the storage device is logically partitioned into volumes and wherein the accessed group of files span multiple volumes.

13. In a data processing system having at least one storage device for storing files and a processor running an operating system, a method comprising the computer-implemented steps of:

defining a summary catalog data type in the operating system;

providing functions for manipulating the summary catalog data type;

accessing a group of files to obtain property information from the files;

with the provided functions, storing the property information obtained from accessing the files in a first summary catalog, which is of the summary catalog data type, on the storage device, the first summary catalog having an entry for each file and each said entry holding property information obtained from the file;

for each file in the group of files, storing information for accessing the file in the first summary catalog;

querying the first summary catalog to obtain selected property information stored in the first summary catalog for the group of files; and storing the selected property information obtained by querying the summary catalog in a second summary catalog of the summary catalog data type on the storage device.

14. The method of claim 13 wherein the step of accessing the group of files comprises the step of querying the group of files to obtain property information from the files.

15. The method of claim 13, further comprising the step of using the information for accessing one of the files in the group of files stored in the first summary catalog to access the file.

16. The method of claim 13, further comprising the step of using the information for accessing one of the files in the group of files stored in the second summary catalog to access the file.

17. In a distributed system having computer systems wherein each computer system includes at least one storage device and at least one processor running a distributed operating system, a method comprising the computer-implemented steps of:

defining a summary catalog data type in the distributed operating system and defining functions for manipulating structures of the summary catalog data type;

providing a first summary catalog and a second summary catalog, each of the summary catalog data type and stored on the storage devices, said first summary catalog and said second summary catalog holding property information derived from disjoint sets of objects; and reconciling the first summary catalog with the second summary catalog and reconciling the second summary catalog with the first summary catalog so that the first and second summary catalogs merge to hold the same property information.

18. In a distributed system having computer systems running a distributed operating system and storage devices storing files, a method comprising the computer-implemented steps of:

with the distributed operating system, defining a summary catalog object class that sets forth attributes of a summary catalog object and that specifies functions for acting on summary catalog objects;

creating an instance of an object of the summary catalog object class;

performing a query on the files; and using the object of the summary catalog to store results of the query.

* * * * *